April 17, 1962
R. L. WHEARLEY ETAL
3,030,257
HEAT RESISTANT INSULATED ELECTRICAL
COMPONENTS AND PROCESS OF MAKING
Filed Dec. 2, 1957
2 Sheets-Sheet 1
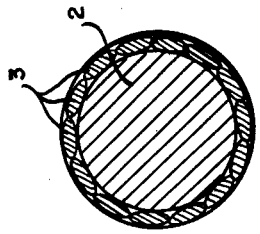
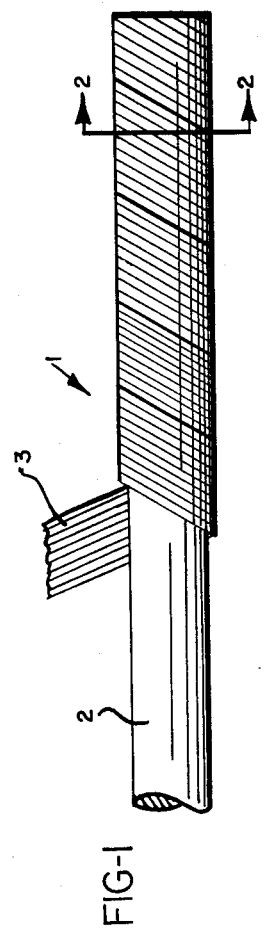
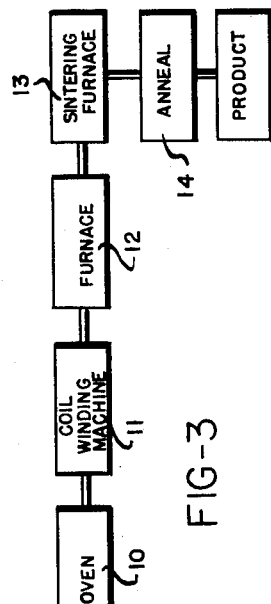
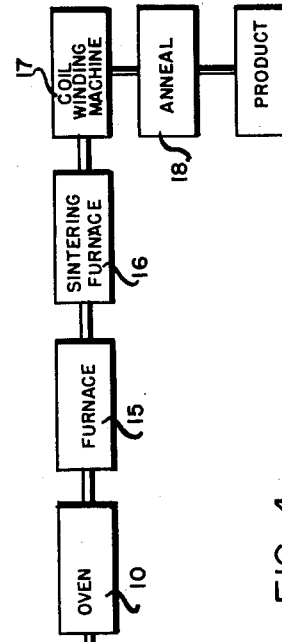
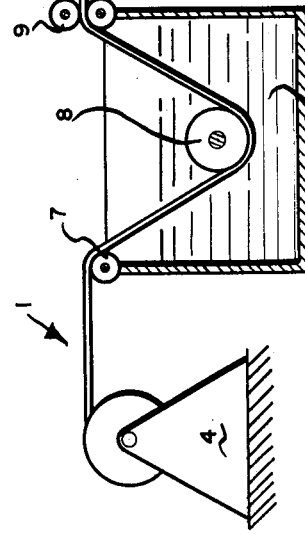
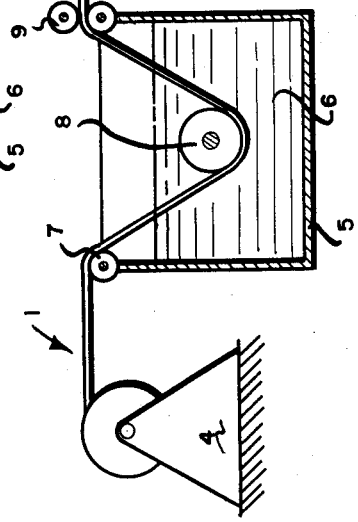
INVENTOR.
ROBERT L. WHEARLEY
HERMANN C.N. HECKEL
BY Toulmin Toulmin
ATTORNEYS April 17, 1962 R. L. WHEARLEY ETAL 3,030,257
HEAT RESISTANT INSULATED ELECTRICAL
COMPONENTS AND PROCESS OF MAKING
Filed Dec. 2, 1957 2 Sheets-Sheet 2

INVENTOR.
ROBERT L. WHEARLEY
HERMANN C. N. HECKEL
BY Toulmin & Toulmin
ATTORNEYS

United States Patent Office 3,030,257
Patented Apr. 17, 1962

3,030,257
HEAT RESISTANT INSULATED ELECTRICAL COMPONENTS AND PROCESS OF MAKING
Robert L. Whearley, Fort Wayne, Ind., and Hermann C. N. Heckel, Oxford, Ohio, assignors, by mesne assignments, to Rea Magnet Wire Company, Inc., Fort Wayne, Ind., a corporation of Delaware
Filed Dec. 2, 1957, Ser. No. 700,044
4 Claims. (Cl. 156—52)

This invention relates to improved insulated electrical conductors which will withstand high temperatures, that is, 500° C. and above; the invention is also directed to processes for the production of such conductors.

An important object of the invention is the provision of novel insulated electrical conductors which may be formed into electrical components such as coils.

A further object of the invention is the provision of novel processes for the insulation of electrical conductors and the formation thereof into electrical components such as electric coils.

In producing the electrical conductor of this invention a layer of glass in fibrous form is first applied to the flexible bare conductor wire, which is suitably magnet wire. The fibrous glass may be in the form of a thread spiralled on the wire, a braid or a tape; the application of the fibrous glass does not materially affect the flexibility of the wire, and the fibrous glass winding, although porous and pervious and inadequate to protect the wire from oxidation, is effective as a spacer in coil formation, for example.

The fibrous glass layer which is to maintain its integrity throughout the process is suitably a borosilicate glass; in general, the soft borosilicate glasses are suitable for this fibrous glass layer or covering.

The fibrous glass layer is impregnated, in the practice of the invention, with the combination of a heat fusible glass and a depolymerizable evaporable resin material. Application is suitably made from a dispersion of the glass powder in a resin solution, the resin serving to carry the glass powder into interstices of the fibrous glass layer wound on the magnet wire.

After evaporation of the resin solvent the conductor is in a flexible state and may be wound into a coil, whereafter the resin is evaporated from the fibrous glass and the remaining powdered glass is sintered or fused to cause it to adhere to the fibrous glass layer and the magnet wire.

Alternatively, the resin may be evaporated from the fibrous glass and the powdered glass may be sintered or brought to a fusion state and the coil wound while the powdered glass is softened.

With either method it is desirable to anneal the resultant product, as such practice improves the electrical characteristics of the completed coil.

The powdered glass when it sinters or fuses tends to form a discontinuous phase in the fibers, adheres well to the fibrous glass which retains its integrity and has the interstices thereof filled with the glass of the powder. Further the fused glass aids in the adherence of the fibrous glass layer to the magnet wire.

Suitable fusible glasses include those which have relatively high percentages of lead oxide, boric oxide and aluminum oxide. Preferably also the fusible glass has a thermal coefficient of expansion closely approaching that of the wire.

The invention will be more fully understood by reference to the following detailed description and accompanying drawings wherein:

FIGURE 1 is a fragmentary side view of a conductor, somewhat enlarged, and having portions of the layer of insulation stripped back to illustrate the arrangement of the glass fibers;

FIGURE 2 is a sectional view, somewhat enlarged, taken on line 2—2 of FIGURE 1;

FIGURE 3 is a diagrammatic flow chart illustrating one method of producing a coil in accordance with the invention;

FIGURE 4 is a diagrammatic flow chart illustrating another method of forming a coil in accordance with the invention;

Figure 5:
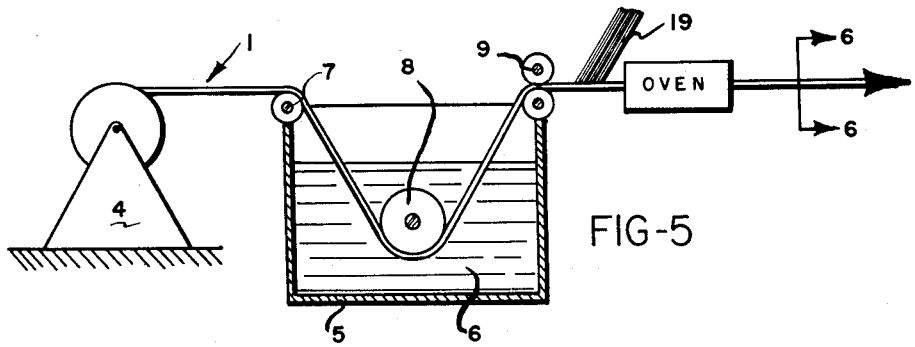
FIGURE 5 illustrates a modification of the invention applicable to the processes illustrated in FIGURES 3 and 4.

Referring to the drawings, the numeral 1 in FIGURE 1 indicates an insulated electrical conductor utilized in the practice of the invention. The numeral 2 designates a magnet wire, that is, substantially pure copper wire, surrounded by a layer 3 of glass fibers; in the present instance these fibers comprise a plurality of threads, for example, ten threads each having a plurality of filaments, for example, about 200. The threads are wound about the wire 2 and, as may be noted from FIGURE 3, the thread thickness is small relatively to the wire diameter.

The fibers of the layer 3 suitably have a relatively high softening point, about 1300° F. Higher softening point fibers, in the range up to about 1700° F., are suitable and practical for the purpose of the invention. The fibers of layer 3 must, of course, be flexible and maintain their integrity at the softening point temperature of the heat fusible glass.

As already noted borosilicate glasses serve the purpose well for layer 3, are compatible with the conductor wire, and not subject to deterioration with age.

In the formation of a coil the electrical conductor 1 is passed from a reel or drum at 4 through a tank 5 containing a dispersion. In passing into the dispersion the conductor is led over a pulley 7 and a pulley 8 within the dispersion and out through squeeze rolls indicated at 9.

A suitable formulation for the dispersion 6 has been found to be 60 percent by volume of a powdered low softening point glass, such as the lead glass to which reference has already been made. A suitable product for the purpose is that produced by Vitro Mfg. Co., of Pittsburgh, under the trade designation 16W4. The dispersion also contains 40 percent by volume of a solution of methylisobutyl ketone and methyl methacrylate molding powder. The molding powder is suitably present to the extent of about 35–40 percent by weight of the resin-ketone solution.

The conductor 1 as it passes through the dispersion 6 picks up the resin and glass in the interstices of the fiber. Upon emanating from the tank 5 excess solvent is squeezed out by the rolls 9 and the impregnated conductor is delivered to an oven 10. This oven suitably operates at a temperature of about 115° C. to remove the solvent from the conductor. The conductor emanating from the oven 10 is flexible and is delivered to coil winding machines indicated at 11 in FIGURE 3 for the formation of the coil. Thereafter the coils are passed to a furnace 12 operating at a temperature of from 350–400° C.

The coils are maintained in the oven for a sufficient length of time to depolymerize and completely evaporate the resin from the glass fibers without carbonization of the resin. If desired the furnace 12 may be operated at reduced pressure to assist resin evaporation. Also if desired an atmosphere of inert gas, such as argon, may be employed to aid the removal of the gases occasioned by the depolymerization of the resin. The time normally required to complete removal of the resin at 350° C. is approximately one hour.

From the furnace 12 the coils, which now comprise the wound wire, the borosilicate fibers and powdered glass within the interstices of the fibers, are passed to a sintering furnace 13. The temperature of this furnace is normally about 750° C., sufficient to soften the powdered glass material and to cause the same to adhere to both the wire and the borosilicate glass fibers.

From the sintering furnace the coils are suitably passed to an annealing furnace, operating at a temperature of about 500° C., and the coils are maintained at this temperature for approximately two hours, and then cooled very slowly to room temperature.

The powdered glass fused in situ with the covering of glass fibers and the wire renders the covering impervious and with the covering provides excellent electrical insulation. Further the covering itself, being of an accurate thickness, serves as an excellent spacer between adjacent turns of a coil.

Referring now to FIGURE 4 there is illustrated another modification, and as will be noted from the drawings, conductor 1 is similarly treated as in FIGURE 3, that is, it is passed through the impregnating bath 6 and the oven 10 to remove solvent. In this instance, however, a furnace 15 receives the flexible conductor passing from the oven 10. This furnace operates at a temperature of about 350° C. and is effective to depolymerize and volatilize the acrylate resin in the same manner as described in connection with furnace 12 of FIGURE 3.

The resin-free covered wire is then passed to the sintering furnace 16, wherein the glass powder is fused to cause it to adhere to the wire and to the covering 3. While in the fused state of the powdered glass and flexible, the conductor is passed through winding machines and wound into coils as indicated at 17. The coils are then annealed in an oven 18 at a temperature of about 500° C. for about two hours, followed by a slow cooling to room temperature.

Figures 6, 9:
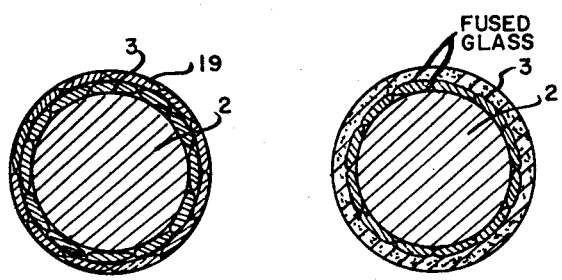
FIGURE 6 is a sectional view taken on line 6—6 of FIGURE 5.
FIGURE 9 is a sectional view illustrating a conductor insulated in accordance with the invention.

Referring now to FIGURES 5 and 6, the conductor 1, emanating from the resin-glass powdered dispersion, may suitably be served with an outer sheath 19 of glass fibers of relatively low softening point, that is, about the same softening point as that of the glass powder. The fibers of this sheath may, similar to the powder, comprise a leaded glass. The conductor having the outer sheath 19 thereon (FIGURE 6) may then be treated exactly as in FIGURES 3 or 4, that is, by initially removing the solvent in the oven and then either winding the coil, thereafter moving the resin and sintering; or, as in FIGURE 4, by first removing the resin, then sintering and winding while hot into coil form.

The fused sheath 19 tends to form a substantially continuous film over the covering 3 and the glass dispersed in the interstices of the covering; this latter glass is fused in situ to the wire and fibers of covering 3.

Figure 8:
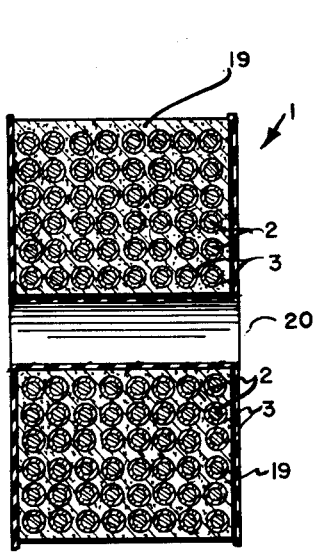
FIGURE 8 is a sectional view of a completed coil.

FIGURE 8 illustrates the completed coil wound on a ceramic bobbin 20, and as will be noted the voids or interstices of the covering 3 have been filled with the fused glass.

Figure 7:
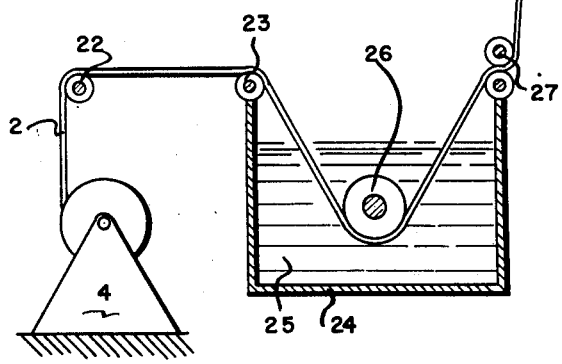
FIGURE 7 illustrates a further modification of the invention applicable to the processes illustrated in FIGURES 3 and 4.

Referring now to FIGURE 7 the bare conductor wire 2 may first be coated with a resin, such as the methyl methacrylates, polyurethanes or similar heat decomposable resins, before application of the serving of high fusion point fibers. Such resin coating serves to aid retention of the fibers on the wire; accordingly as illustrated in FIGURE 7 the wire 2 may be passed over pulleys 22 and 23 to tank 24 containing methyl methacrylate resin in methyl isobutyl ketone to coat the wire.

The wire then passes under pulley 26 to rolls 27 and then is served with a high melting fiber designated 28. The served wire then passes over pulley 29 to tank 5 and is treated in the same manner as set out in connection with the description of FIGURE 5. The resin on the wire is decomposed in subsequent heat treatment steps without adverse effect on the glass.

The structure of FIGURE 8 illustrates the completed coil wound on a steatite bobbin 20, and as will be noted the voids or interstices of the covering 3 have been filled with fused glass.

FIGURE 9 illustrates in cross-section a single wire in which the fused glass both surrounds and permeates the high softening point glass, the fused glass extending to the wire and aiding retention of the high softening point fibers which have retained their integrity.

If desired the completed coil may be completely enclosed or encapsulated in inorganic material such as cast molten glass. Such tends to improve the appearance of the product.

The terms "sintering temperature," "softening temperature" and "fusion temperature" as utilized in this application are to be understood as referring to that point in the temperature scale at which the glass is soft enough to adhere to other glass and to flow sufficiently to enter the interstices of glass fibers in the form of tape, braid, threads and similar materials.

With respect to the low softening point glass fibers they, like the glass forming the sheath 19, may comprise the following constituents:

|  | Range, percent | Specific Composition, Percent |
|---|---|---|
| $SiO_2$ | 45-55 | 52 |
| $Na_2O$, $K_2O$ | 8-12 | 10 |
| CaO, MgO | 9-13 | 11 |
| PbO | 18-22 | 20 |
| $Al_2O_3$ | 5-8 | 7 |
|  |  | 100 |

For purposes of aiding fiberization boric oxide and other known glass forming constituents may be included in small amounts. Such inclusions also aid selection of specific temperature coefficients of expansion and softening points. In general, the softening points of such glasses are selected to be at least about 100° F. lower in softening point temperature than the glass of the fibers forming the covering or layer 3.

While the invention has been described with specific relation to copper wire and is concerned primarily with magnet wire wherein the wire dimensions may vary considerably, down to very fine wire, other materials and conductor shapes may be utilized; the softening point of the glasses may then be selected in accordance with the melting point temperature of such other conductors.

This application is related to: Serial No. 657,893, Robert L. Whearley, Evert A. Mol, filed May 8, 1957, title: Insulated Wire Particularly for Coils and the Manufacture Thereof; Serial No. 661,169, Robert L. Whearley, filed May 23, 1957, title: Electrical Apparatus and Method of Manufacturing the Same, now U.S. Patent 2,982,888; Serial No. 661,170, Robert L. Whearley, filed May 23, 1957, title: Insulated Winding and Process of Manufacture Thereof, now U.S. Patent No. 2,982,889; Serial No. 699,965, Robert L. Whearley, Leo J. Novak, Fritz O. Deutscher, filed December 2, 1957, title: Insulated Electrical Equipment and Process of Making, now U.S. Patent No. 3,012,092; Serial No. 700,173, Robert L. Whearley, Hermann C. N. Heckel, filed December 2, 1957, for: Electrical Components Insulated with Glass and Process of Making—all assigned to the same assignee as the present invention.

It will be understood that this invention is susceptible to modification in order to adapt it to different usages and conditions and accordingly, it is desired to comprehend such modifications within this invention as may fall within the scope of the appended claims.

What is claimed is:
1. A process of making insulated electrical conductors comprising the steps of:
   (a) providing a flexible bare electrical conductor wire,
   (b) wrapping glass fiber of relatively high melting point spirally around said wire to form a layer of fiber glass thereon,
   (c) applying over said fibrous glass layer a dispersion of powdered glass particles of relatively low melting point in a solution of resin dissolved in resin solvent to cause said glass particles to enter into the interstices of said fibrous glass layer,
   (d) thereafter heating the resultant coated wire to evaporate said resin solvent, and
   (e) increasing the temperature of heating to bring about sintering of said glass particles to cause the same to adhere to said fibrous glass layer whereby a flexible insulated electrical conductor is provided, said glass fiber having a melting point ranging between about 1300° and 1700° F., and the melting point of said powdered glass particles being approximately 100° F. below the melting point of said glass fiber.

2. A process of making insulated electrical conductors as set out in claim 1, and wherein the relatively high melting point glass fiber is composed of borosilicate glass, and said powdered glass particles are composed of lead silicate glass.

3. A process of making insulated electrical conductors as set out in claim 1, and wherein after applying over said fibrous glass layer a dispersion of powdered glass particles in resin dissolved in resin solvent, the resultant coated wire is shaped into a coil and thereafter heating the coil in accordance with steps (d) and (e) of claim 1.

4. A process of making insulated electrical conductors as set out in claim 1, and wherein the heating steps (d) and (e) are carried out under an inert gas atmosphere.

References Cited in the file of this patent

UNITED STATES PATENTS

| | | |
|---|---|---|
| 702,725 | Hammesfahr | June 17, 1902 |
| 2,105,166 | Schwarzkopf | Jan. 11, 1938 |
| 2,207,509 | Carl | July 9, 1940 |
| 2,209,850 | Shand | July 30, 1940 |
| 2,227,931 | Greenleaf | Jan. 7, 1941 |
| 2,308,409 | Wenzel | Jan. 23, 1943 |
| 2,394,591 | Bricker | Feb. 12, 1946 |
| 2,639,247 | Squire | May 19, 1953 |
| 2,692,218 | Nicoll et al. | Oct. 19, 1954 |
| 2,809,141 | Biddison | Oct. 8, 1957 |
| 2,877,144 | Iversen | Mar. 10, 1959 |

FOREIGN PATENTS

| | | |
|---|---|---|
| 710,711 | Great Britain | June 16, 1954 |